United States Patent [19]

Campbell

[11] Patent Number: 4,840,097
[45] Date of Patent: Jun. 20, 1989

[54] PORTABLE MITER GUIDE DEVICE FOR PORTABLE POWER SAWS

[76] Inventor: Erwin D. Campbell, 10 Capewood Dr., #180, Simpsonville, S.C. 29681

[21] Appl. No.: 85,936

[22] Filed: Aug. 17, 1987

[51] Int. Cl.$^4$ .............................................. B26D 1/18
[52] U.S. Cl. ................................. 83/829; 83/471.3; 83/486.1; 83/522; 83/574; 83/745
[58] Field of Search ............. 83/829, 522, 574, 471.3, 83/486.1, 745, 748

[56] References Cited

U.S. PATENT DOCUMENTS

| | | | |
|---|---|---|---|
| 2,714,903 | 8/1955 | Miller | 83/564 |
| 2,803,271 | 8/1957 | Shaw | 83/522 |
| 2,911,017 | 11/1959 | Holder | 83/574 |
| 3,128,802 | 4/1964 | Hostetter | 83/574 X |
| 3,368,594 | 2/1968 | Drumbore | 83/467 R |
| 4,109,901 | 8/1978 | Akin | 83/522 X |
| 4,176,571 | 12/1979 | Batson | 83/397 |

Primary Examiner—Frank T. Yost
Assistant Examiner—Eugenia A. Jones
Attorney, Agent, or Firm—Cort Flint

[57] ABSTRACT

A portable miter guide device for portable power saws which is easily disassembled for transportation and readily used on any table or support on the work site. The device comprises horizontal surfaces for guiding the portable power saw across the work piece at various angles to the side of the lumber or work piece. It also includes a base for supporting the horizontal guides which can readily be supported on the table or the like which includes vertical surfaces for engaging the sides of the work piece.

20 Claims, 3 Drawing Sheets

PORTABLE MITER GUIDE DEVICE FOR PORTABLE POWER SAWS

BACKGROUND OF THE INVENTION

The present invention relates generrally to a portable guide arrangement for facilitating the cutting of mitered joints with a portable power saw.

Portable power saws of the simpler saw type, commonly known as builder saws, are in widespread use in the construction industry and have, to a large extent, supplanted the large amount of hand sawing formerly required in the building trade. Such saws are particularly well-suited for the numerous cross-cuts necessary in the rough framing of buildings and for such work, may be readily hand guided to produce satisfactory cuts. However, for finish work, such as the interior or exterior trim and, especially for miter joints which must be accurately executed, the portable saw has proven difficult to control without some type of auxilary guide. The difficulty stems primarily from the problem of aligning the circular saw blade, which is practically concealed in a cumbersome casing and guard. In addition, the vibration and high cutting speed of the saw and, the line obscuring saw dust, generated during a cut, impede accurate work. Since it cannot be usually determined until well after a cut is started whether the saw is, in fact, properly aligned with the desired cut line false starts are common in hand guided saw operations and a considerable wastage of material and time results.

Because of the above difficulties, incidental to hand guided saw operations, guide arrangements of various types have been devised for portable power saws to permit a correct initial alignment of the saw and to maintain the alignment during the cutting operation. The miter guides, previously developed, generally include a horizontal track for guiding the saw over the work piece to be cut and the guide in normally pivotally mounted on a work supporting table to permit adjustment to the desired cutting angle. Such guides have the further advantage of permitting multiple cuts at the same cutting angle with a substantial savings of time and an improved accuracy over the former cutting methods.

A serious short coming of such devices has been the cumbersome nature of the table saw which must be carried to the work station and set up each time. An example of such guides in combination with a tabe are shown in U.S. Pat. No. 2,803,271.

Still another approach has been found in U.S. Pat. No. 2,714,903. The device of this patent has a base mechanism which clamps onto the work table and has two lateral guides for extending across the work piece. This device also requires a work table to support the base of the saw guide.

A similar saw guide is found in U.S. Pat No. 2,630,146, wherein the saw guides and support are pivotally supported on a base which is clamped to a work table. Again this necessitates the use of a permanent clamping mechanism to clamp it to a table. Similar saw guides are found in U. S. Pat. Nos. 2,513,497 and 3,368,594.

SUMMARY OF THE INVENTION

In view of the short comings noted above of previously developed saw guides, it is a primary object of the present invention to provide a miter guide for portable power saws which is adapted for use on a work site without resort to tables saws or the like.

Another object of the invention is to provide a miter guide which is protable and yet readily adjustable.

Still another object is to provide a saw guide which is readily adjustable to a plurality of angles for making miter cuts.

These and additional objects and advantages of the invention are achieved by the provision of a portable miter guide for portable power saws which comprises a base for supporting spaced, elongated guide elements for the power saw itself. The base is adapted to fit against sides of the work piece whereas the elongated guide elements are adapted to extend across the work piece for guiding the portable power saw in a straight line across the work piece at one of a plurality of angles.

The construction designed to carry out the invention will hereinafter be described, together with other features thereof.

DESCRIPTION OF THE DRAWINGS

The invention will be more readily understood from a reading of the following specification and, by reference to the accompanying drawings forming a part thereof, wherein an example of the invention is shown and wherein.

DETAILED DESCRIPTION OF A PREFERRED EMBODIMENT

Figure 1:
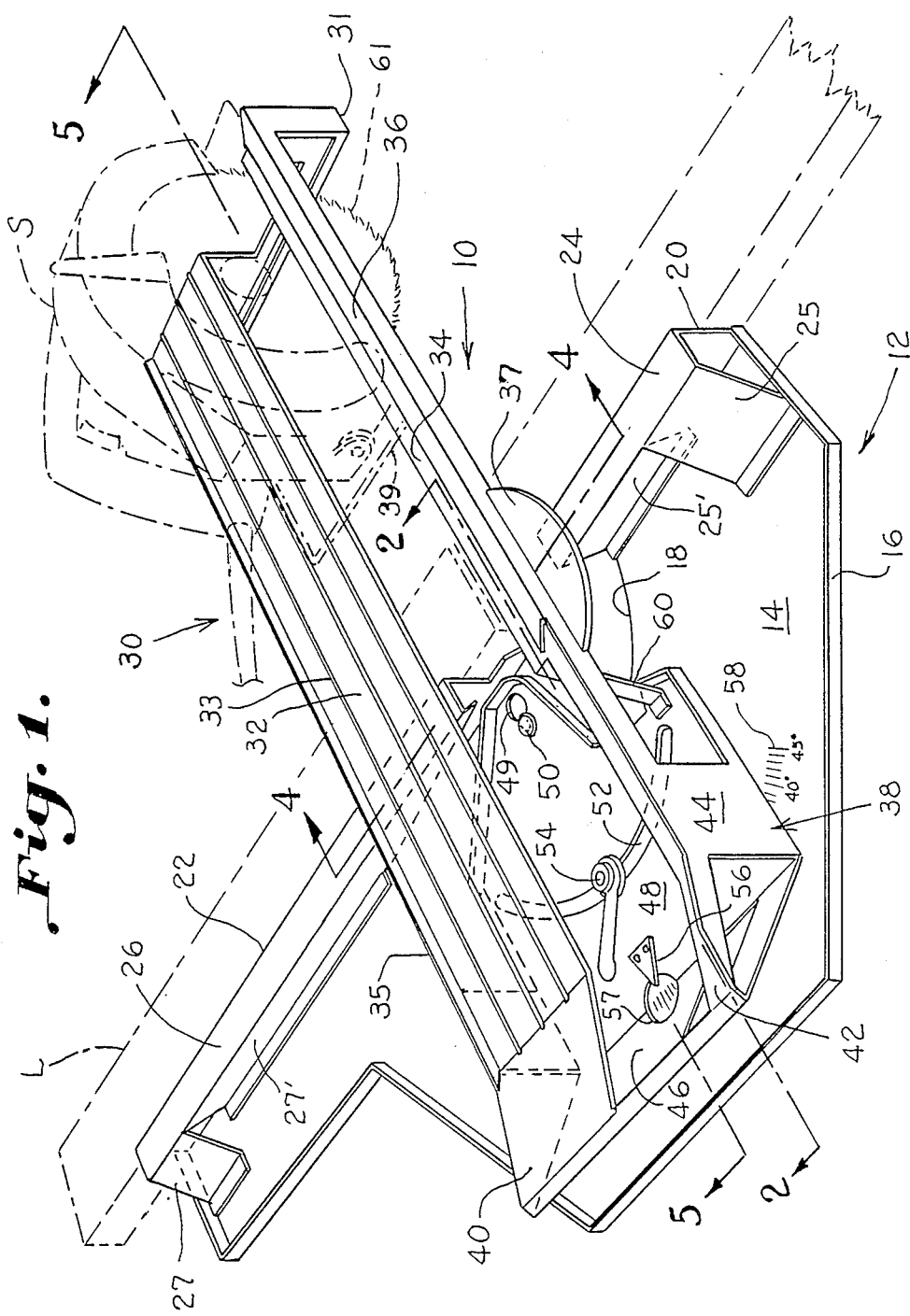
FIG. 1 is a perspective view of a portable miter guide embodying the present invention showing in phantom the portable power saw being guided by said device.

Referring to the drawings, a miter guide device for portable power saws, generally designated as 10, embodying the present invention is shown supported over a piece of lumber L in FIG. 1 The miter guide comprises a base 12 which has a horizontal plate 14 which is provided with vertical edges for sake of rigidity. Base 12 has a cut-out 18 to permit the blade 61 of saw S to avoid striking plate 14 when saw S begins its passage across the lumber. The base also has vertical walls 20 and 22 disposed on respective sides of cut-out 18. Vertical wall 20 extends from the base plate 14 to a horizontal surface 24 and vertical wall 22 extends from the base plate 14 to a horizontal surface 26. Horizontal surface 24 is provided with a buttress 25 which extends at an angle from surface 24 to horizontal plate 14 at which point it is welded or otherwise rigidly fixed to plate 14. Second buttress 25' also extends from surface 24 to contact horizontal base plate 14 at or adjacent to the point where vertical wall 20 contacts plate 14. At which point buttress 25' is affixed to horizontal plate 14 as by welding or the like.

On the other side cut-out 18 a second horizontal guide surface 26 is provided with a buttress 27 and a second buttress 27' which extends from surface 26 to the horizontal plate 14 at which point they are also fixed to plate 14 by welding or the like.

Saw guide 30 comprises a first horizontal saw support surface 32 having a plurality of ribs 33 (see FIG. 4) and a second horizontal saw surface 34 having an upwardly extending flange 35 to add rigidity to the structure. Horizontal support surfaces 32 and 34 extend in cantilever fashion from a saw support housing 38. Saw support surface 34 is provided with a saw retainer and guide 36 for retaining and guiding the base 39 of the portable saw in a straight line across the lumber to be cut by the saw. surfaces 32 and 34 are supported in cantilever fashion from saw guide support housing 38. The cantilevered ends of surfaces 32 and 34 are joined by vertical crossbar 31 which in turn has a notch to permit the saw to travel the entire length of surfaces 32 and 34. Saw base 39 is supported and guided directly on horizontal support members 32,34 without need of a separate carriage.

The other end of surfaces 32 and 34 are joined to the saw guide support housing 38 and surfaces 32 and 34 terminate in upwardly extending lift surfaces 40 and 42, respectively. Saw guide support housing 38 comprises vertical walls 44 extending downwardly from surfaces 32 and 34 to a bottom 48 of the saw support housing. Bottom 48 rests upon the base plate 14 of the base 12 and pivots relative thereto about a pivot bolt 50 in a slot 49. Slot 49 has two openings for bolt 50. The first opening is larger than the head of the bolt and the second opening is smaller than the head of the bolt but fits about the shank of the bolt. Also connecting bottom plate 48 of the saw support housing to horizontal plate 14 of base 12 through an adjustment slot 52 is a three-quarter-turn lock bolt 54 which has double threads to permit quick locking and releasing of support housing 38 from the base plate 14. Bottom 48 of the saw support housing is provided with a window 57 into which extends a pointer 56. Window 57 extends over an arcuate scale 58 which indicates the angle that the saw guide extends relative to vertical walls 20 and 22 on base 12.

Surfaces 40 and 42 are connected to the bottom 48 by an angle wall 46 and surfaces 40 and 42 are elevated above saw guide surfaces 32 and 34. This provides a support for the portable saw which keeps its blade from engaging the bottom 48 of the saw support housing when the saw is resting thereon. A saw guard rail 60 connects surface 34 to the bottom 48 of the housing 38 and provides a cam surface for raising the guard 64 of the portable saw as the saw is guided along surfaces 32 and 34 in operation.

The saw S, as seen in FIG. 1, comprises a saw blade 61 and a saw blade guard 64 which must be raised before cutting can begin on the work piece. Camming surface 60 raises the guard of the saw S as it traverses the work piece.

Figure 2:
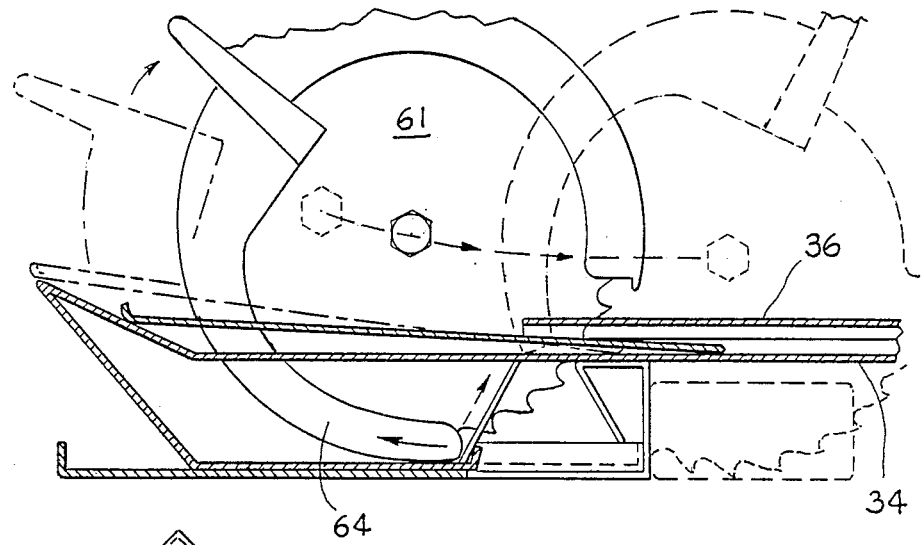
FIG. 2 is a sectional view of the portable miter guide device shown in FIG. 1 taken along line 2—2 of FIG. 1.

In operation, the miter guide device 10 is supported on a work table so that saw guide 30 extends in a cantilevered fashion over lumber L and the depth of the saw blade is adjusted for the thickness of the lumber to be cut. The base of the portable saw is placed onto surfaces 40 and 42 of the saw guide support housing 38 and the saw is lifted and guided along these surfaces to clear the base as seen in FIG. 2 of the drawings. As the saw moves towards the work piece or lumber L, guard 64 rides up the saw guard rail 60 as the saw blade 61 is lowered to come into contact with the work piece or lumber L. As saw S is moved manually along surfaces 32 and 34 the saw blade is guided in a straight line at the angle at which the saw guide 30 is set relative to base 12 so as to cut the work piece lumber L at the desired angle. As soon as one work piece L is cut at the proper angle, the portable saw S is returned to its resting position on support housing 38 as seen in FIG. 2 to await the placement of a new work piece L.

From the foregoing, it can be understood that the present invention provides an improved miter guide for a portable power saw which may quickly and accurately adjusted to the desired miter setting. The miter guide may be quickly disassembled and removed from the cutting table for storage and transferred to a new location or for safe keeping simply by loosening lock bolt 54 and disconnecting the saw guide 30 from base 12.

Figure 3:
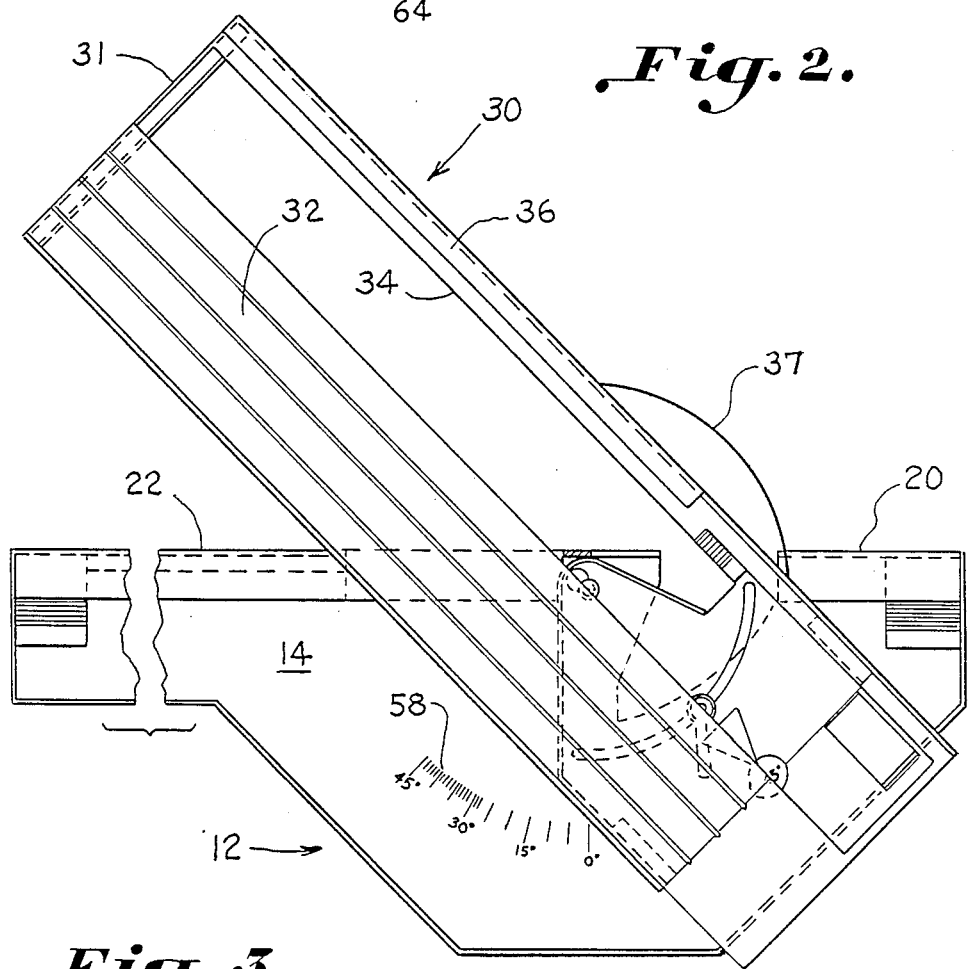
FIG. 3 is a plan view of the portable guide illustrated in FIG. 1 with the portable saw removed for sake of clarity.
Figure 4:
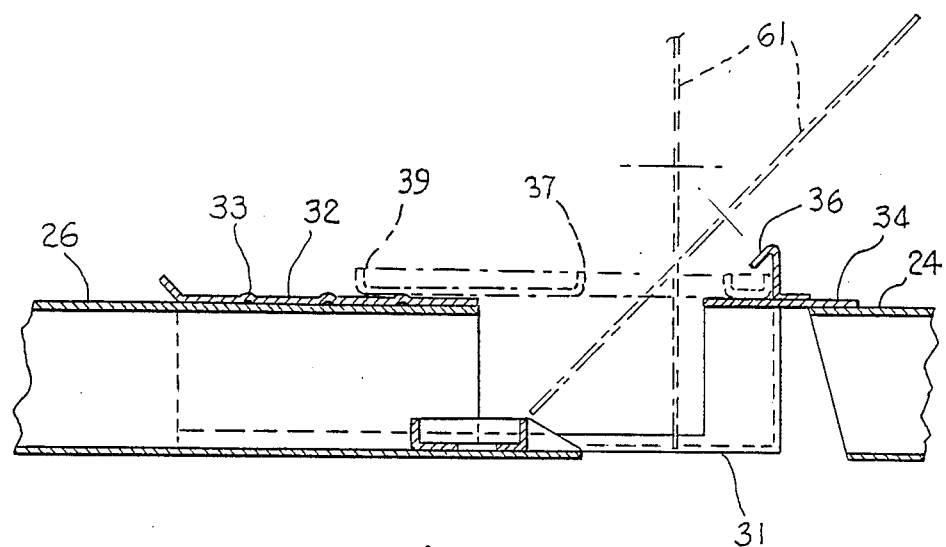
FIG. 4 is a sectional view of the saw guide illustrated in FIG. 1 taken along line 4—4 of FIG. 1.
Figure 5:
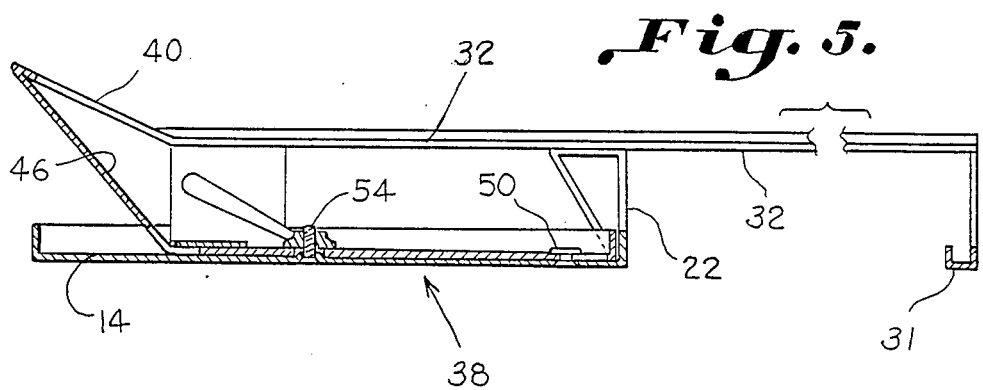
FIG. 5 is a sectional view taken along line 5—5 of FIG. 1.

As seen best in FIGS. 3 and 4, opening 18 is such that as to permit saw blade 61 to clear the horizontal plate 14 of base 12 at whatever angle the saw guide is set and whatever angle blade 61 is set as seen in FIG. 4. It will also be noted that saw guide support surface 37 is curved so as to provide continuing support for the saw guide from surface 24 without unduly increasing the width of the guide itself. Lift surfaces 40 and 42 importantly maintain the saw blade and guard tilted and out of contract with base 48 to facilitate movement of the saw on to the guide until guard 64 reaches cam 60.

It is obvious that changes in construction may be made by those skilled in the art without imparting from the spirit and scope of the invention as set forth in the appended claims.

What is claimed is:

1. A portable miter guide device for a portable power saw, comprising:
   (a) a saw support and guide comprising:
      (1) two spaced horizontal elongated members on which a base of said saw is directly supported and guided during saw operation; said horizontal elongated members adapted to extend over the upper surface of lumber to be cut and to guide the blade of said power saw in a straight line between said elongated members;
      (2) vertical means for connecting the ends of said horizontal elongated members to maintain the spacing therebetween constant;
      (3) a saw support and guide housing having a horizontal support surface spaced from said horizontal elongated members and connected thereto by a plurality of walls extending at an angle from said horizontal elongated members and said horizontal support surface; and
      (4) at least one saw lift surface at one end of said horizontal elongated members which extends upwardly from said horizontal elongated members at an angle of less than 90 degrees by which said saw base is directly engaged to lift and guide said power saw out of contact with said support and guide housing during movement of said power saw onto said elongated members for saw operation;
   (b) a support base having a horizontal surface for supporting said saw support and guide having spaced vertical surfaces extending at a substantially right angle to the horizontal surface of said base for contact with said lumber;
   (c) means for pivotally connecting said saw support and guide housing horizontal support surface to said base horizontal support surfaces for pivotal movement relative thereto; and
   (d) means for temporarily locking said horizontal support surfaces in a plurality of angular positions, whereby said elongated members may guide said power saw acros said lumber in one of a plurality of straight line positions at an angle to the side of said lumber.

2. The miter guide device as set forth in claim 1, wherein each of said elongated horizontal members have upper flat surfaces for supporting the base of the saw.

3. The miter guide device as set forth in claim 1, wherein one of said horizontal elongated members has a longitudinal retaining edge for retaining the base of the saw while permitting straight line movement of said saw across the work piece.

4. A miter guide device as set forth in claim 1, wherein said support base has two vertical surfaces and said horizontal surface has an arcuate opening to permit passage of the saw blsade during operation of the saw.

5. A miter guide device as set forth in claim 1, wherein said saw support and guide housing comprises a cam surface extending from the horizontal surface of said housing to the horizontal surface of one of said elongated members and adapted to engage the guard of said portable saw before said saw blade contacts the work piece without exposing the operator to said saw blade.

6. A miter guide device as set forth in claim 1, wherein said means for temporarily locking said horizontal support surfaces includes a quick release lock bolt.

7. A miter guide device as set forth in claim 1, wherein said means for pivotally connecting said horizontal support surfaces comprises a bolt fixed to one of said surfaces and engaged in a slot in the other of said surfaces.

8. A miter guide devices as set forth in claim 1, wherein said base horizontal support surface has affixed thereto a scale of degreees and said saw support and guide housing horizontal support surface has a window permitting a view of said scale and includes a pointer for indicating the angle between the saw guide and the vertical surfaces of said support base, 9. A miter guide device as set forth in claim 1, wherein said support base has a plurality of vertical walls extending upwardly about the edge of said base for imparting rigidity to said base.

10. A portable miter guide device for portable power saws, comprising:
   (a) a saw support and guide comprising:
      (1) an elongated member adapted to extend over the upper surface of lumber to be cut and to guide the blade of said power saw in a straight line, said elongated member having two spaced horizontal surfaces for directly supporting the base of said saw and directly guiding said saw in a straight motion during saw operation;
      (2( a saw support and guide housing having a horizontal support surface spaced from said elongated member and connected thereto by a plurality of walls extending at an angle from said member and from said horizontal support surface; and
      (3) at least one lift surface at one end of said horizontal surfaces which extend upwardly from said horizontal surfaces at an angle of less than 90 degrees by which said saw base is directly engaged to lift said saw for entry upon said spaced horizontal surfaces;
   (b) a support base having a horizontal surface for supporting said saw support and guide, and having spaced vertical surfaces extending at a substantially right angle to the horizontal surface of said base for contact with said lumber;
   (c) means for pivotally connecting said saw support and guide housing to said base for pivotal movement relative thereto; and
   (d) means for temporarily locking said support housing and said base in one of a plurality of angular positions, whereby said elongated member may guide said power saw across said lumber in one of a plurality of straight-line positions at an angle to the side of said lumber.

11. The miter guide as set forth in claim 10, wherein said elongated member has two flat surfaces for supporting the base of said saw.

12. The miter guide device as set forth in claim 10, wherein one of said horizontal surfaces has a longitudinal retaining edge for retaining the base of the saw while permitting straight line movement of said saw across the work piece.

13. A miter guide device as set forth in claim 10, wherein said support base has two vertical surfaces and a horizontal surface having an arcuate opening to permit passage of the saw blade during operation of the saw.

14. A miter guide device as set forth in claim 10, wherein said saw and guide housing comprises a cam surface for disengaging the guard of the portable saw before the blade of said saw contacts the lumber without exposing the operator to said saw blade.

15. A miter guide device as set forth in claim 10, wherein said means for temporarily locking said saw support and guide and said support base includes a quick release locking bolt.

16. A miter guide device as set forth in claim 10, wherein said means for pivotally connecting said saw support and guide and said support base includes a bolt fixed to one of said surfaces and engaged in a slot in the other of said surfaces.

17. A miter guide device as set forth in claim 10, wherein said support base has affixed thereto a scale of degrees and said saw support and guide housing includes an indicator for indicating the angle between said saw guide and said support base.

18. A portable guide device for supporting and guiding a portable power saw comprising:
   (a) a saw support and guide which includes a pair of spaced horizontal saw support surfaces for directly supporting a shoe plate of said power saw to guide the blade of said power saw in a straight line between said horizontal support surfaces;
   (b) means for spacing said horizontal support surfaces above a bottom base surface;
   (c) lift means at one end of said horizontal support surfaces elevate in respect to said horizontal support surfaces by which said saw base is directly engaged for lifting and maintaining said power saw out of contact with said bottom base surface as said power saw is guided onto said horizontal support surfaces;
   (d) cam means carried by said bottom base surface for engaging a guard of said portable saw as said saw leaves said lift means before said saw blade contacts the work piece to move said saw guard rearwardly; and
   (e) means for pivotally connecting said saw support and guide to said bottom base surface and means for temporarily locking said horizontal support surfaces of said saw support and guide and any one of a plurality of angular positions so that said elongated support surfaces may guide said power saw across said lumber in a straight line at an angle to the sides of said lumber.

19. The device of claim 18 including a vertical leg carried at the ends of said horizontal support surfaces remote from said lift means for supporting said horizontal support surfaces in a cantilevered manner.

20. The apparatus of claim 18 comprising an upstanding edge carried by one of said horizontal support surfaces terminating at a downwardly inclined angle flange which extends along generally the entire length of said horizontal support surface for engaging said shoe plate of said power saw to prevent said saw from kicking away from said support surface.

* * * * *